Sept. 4, 1951 D. H. LAPOINTE 2,566,421
ANTIFRICTION BEARING-RETAINING STRIP
Filed Nov. 23, 1948 2 Sheets-Sheet 1

Inventor
Donald H. Lapointe
By Seymour, Earle & Nichols
Attorneys

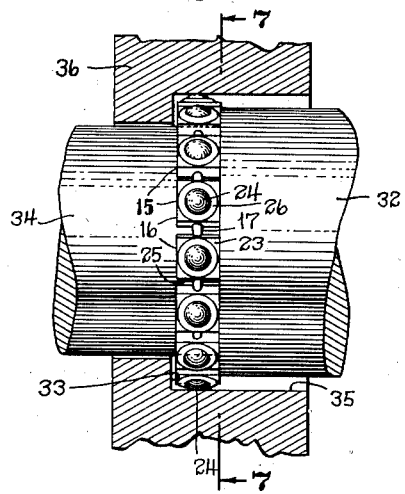
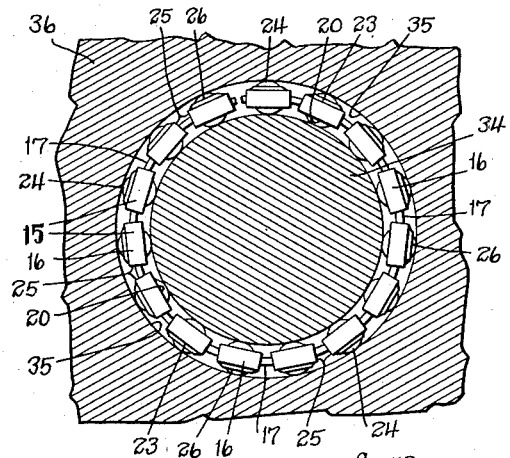
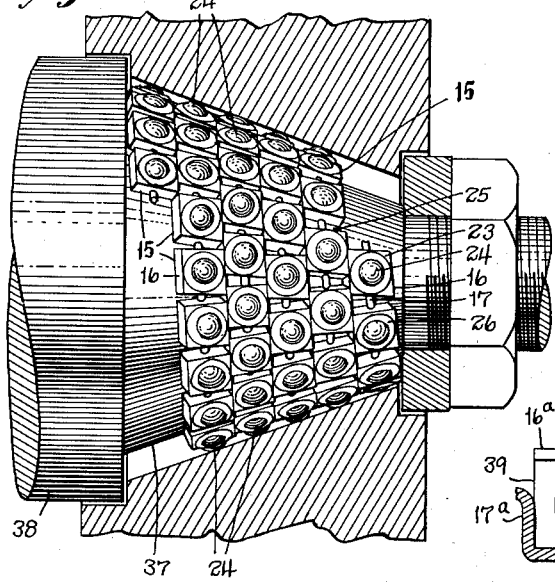
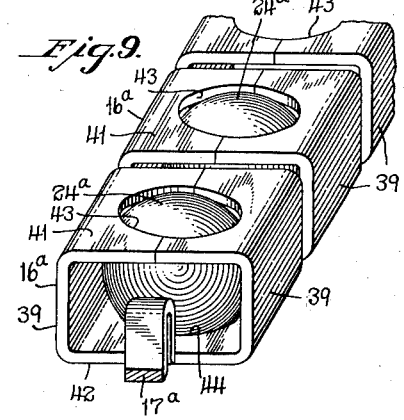
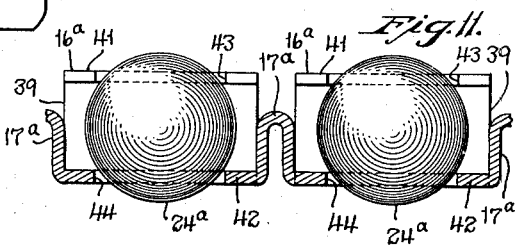
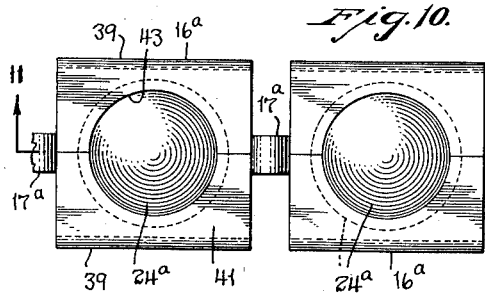
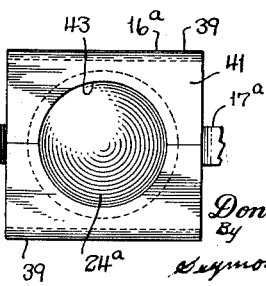

Patented Sept. 4, 1951

2,566,421

UNITED STATES PATENT OFFICE 2,566,421

ANTIFRICTION BEARING-RETAINING STRIP

Donald H. Lapointe, Meriden, Conn.

Application November 23, 1948, Serial No. 61,707

3 Claims. (Cl. 308—201)

The present invention relates in general to antifriction bearings of the ball or roller type and more particularly to improved bearing-retaining means arranged to support balls or rollers in aligned relationship for use either as a radial or as an end-thrust antifriction bearing.

An object of the invention is to provide an improved antifriction bearing-retaining means which may be manufactured in continuous lengths and which is flexible in substantially any direction, whereby a predetermined length of the retaining-means may be used either as an end-thrust bearing or as a radial bearing.

A further object of the invention is to provide an antifriction bearing-retaining means of continuous length wherein the individual antifriction bearings are supported in individual units, each unit being connected to the preceding and succeeding units of the retaining-means by integral flexible ligaments.

With the above and other objects in view, as will appear to those skilled in the art from the present disclosure, this invention includes all features in the said disclosure which are novel over the prior art.

In the accompanying drawings, in which certain modes of carrying out the present invention are shown for illustrative purposes:

Fig. 6 is a broken view of the end of a shaft mounted in a frame-member and provided with a radial bearing constituting a predetermined length of the antifriction bearing-strip of this invention wrapped around the reduced end of the shaft;

Fig. 7 is an end elevation of the radial bearing of Fig. 6 on line 7—7 thereof;

Fig. 8 is an elevation, partly in section, of a portion of a shaft having a conical bearing-surface at one end about which is wrapped successive spirals of the antifriction bearing-packing, the packing being engaged in a raceway formed between the conical surface of the shaft and a conical aperture in a frame-member;

Fig. 9 is a perspective view of a fragmentary portion of a modified form of the antifriction bearing-packing of this invention;

Fig. 10 is a plan elevation of the packing of Fig. 9; and

Fig. 11 is a side elevation on section line 11—11 of Fig. 10 of the modified antifriction bearing-packing.

*The showing of Figs. 1 to 8 inclusive*

Figure 1:
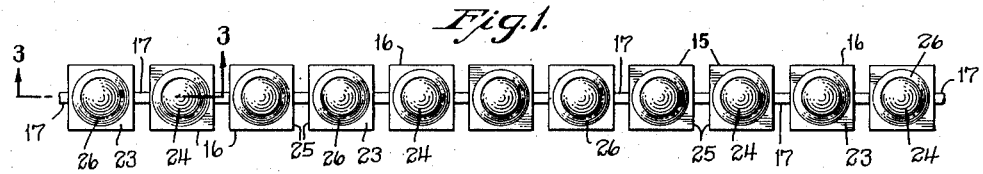
Fig. 1 is a plan view of a short section of the improved antifriction bearing-retaining strip of this invention, the antifriction means being bearing balls.
Figure 2:
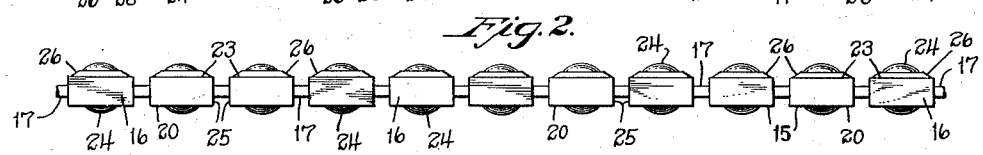
Fig. 2 is a front elevation of the antifriction bearing-retaining strip of Fig. 1.
Figure 3:
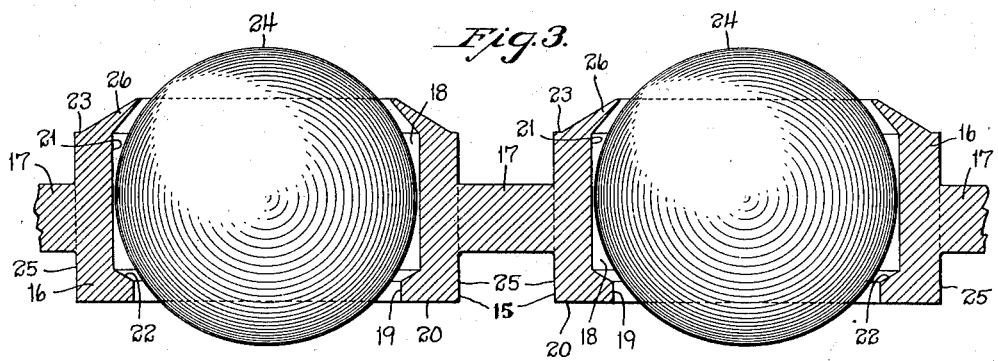
Fig. 3 is an enlarged front elevation of two of the units which make up the antifriction bearing-retaining strip of Fig. 1, the two enlarged units being shown in section on line 3—3 of Fig. 1.
Figure 4:
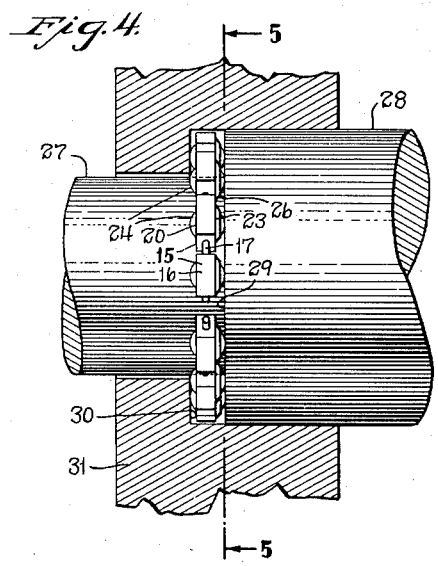
Fig. 4 is a broken view of the end of a shaft mounted in a frame-member and provided with an antifriction bearing formed from the bearing-retaining strip of this invention, the strip being arranged in the form of an end-thrust bearing.
Figure 5:
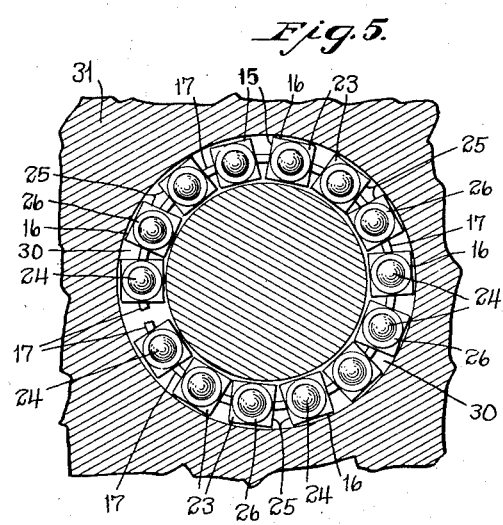
Fig. 5 is an end elevation of the end-thrust bearing of Fig. 4 on line 5—5 thereof.

Referring to Fig. 1 of the drawings, a short length of the improved antifriction bearing-retaining means, hereinafter referred to as "a bearing-retaining strip or bearing-packing," is indicated generally at 15 and comprises a plurality of individual antifriction bearing-retaining units 16, each joined to the preceding and succeeding unit of the continuous strip by an integral element 17 which is turned down or otherwise formed between each pair of successive units, as hereinafter described, to provide a flexible member, hereinafter referred to as a "ligament" capable of flexure in substantially any direction. In accordance with this construction, a continuous length of the antifriction packing 15 may be bent in a plane parallel to the upper and lower faces of the units 16 to form a substantially-continuous ring or annulus, such as shown in Figs. 4 and 5, adapted to be used as an end-thrust bearing. On the other hand, by flexing a continuous length of the retaining-strip in a plane substantially perpendicular to the planes of the upper and lower faces of the units 16, the retaining-strip will take the form of a radial bearing, as shown especially well in Figs. 6 and 7.

In a preferred construction wherein ball bearings are utilized as the antifriction means of the retaining-strip, the strip or packing 15 is formed from a continuous length of bar stock substantially rectangular in cross section by drilling or otherwise forming substantially-vertical ball-bearing receiving-apertures 18 therein at substantially equally-spaced points therealong, each aperture comprising a substantially-vertical bore 19 intersecting the bottom face 20 of the bar stock; and a counterbore 21, the lower end of which forms an annular ball-bearing supporting-shoulder 22 with the upper end of the bore 19. The upper end of the counterbore 21 intersects the top face 23 of the bar stock which is provided with an integral annular ball-retaining lip 26 turned or otherwise formed thereon. The diameter of the counterbore 21 is only slightly larger than the diameter of a ball bearing 24 adapted to be mounted therein, whereby the latter makes a smooth rotatable fit therein, whereas the diameter of the bore 19 is less than that of the counterbore so as to form the aforesaid annular bearing-supporting shoulder 22 for retaining the ball 24 adjacent the lower end of the counterbore. In this connection, the counterbore 21 constitutes a major portion of the depth of the bearing-receiving aperture 18 such that the annular supporting-shoulder 22 supports the ball with a relatively-small portion of the ball's spherical surface projecting from the bottom face 20 of the retainer.

Each successive bearing-supporting unit 16 of the retaining-strip is made from the aforementioned bar stock by milling or otherwise forming a substantially-transverse cut 25 between each successive pair of ball-receiving apertures 18 of the stock. Each transverse cut 25 is made so as to form the aforementioned relatively-short integral ligament 17 interconnecting each successive pair of units 16, the longitudinal axis of each ligament 17 being coincident with the longitudinal axis of the bar stock. For optimum flexure, it is preferred to form each ligament of substantially-circular cross section, its diameter being substantially one-fifth the transverse dimension of the unit and its over-all length substantially one-quarter the transverse dimension of the unit. It will be understood, however, that the ligaments may have other cross-sectional configurations and that the transverse and longitudinal dimensions of the ligaments may vary and depending upon such factors as the uses to which the antifriction bearing-retaining strips are to be put and the material from which a retaining-strip is formed. For most purposes the bar stock comprises a ferrous metal, but it will be understood that the use of a non-ferrous metal or plastic is contemplated within the purview of the invention.

After the bearing-retaining apertures 18 have been formed in the bar stock and the latter divided into separate units 16 united successively by the aforementioned integral flexible ligaments 17, the bearing balls are inserted into the retaining-apertures 18 of the respective units and held therein by staking or otherwise turning over the annular lips 26 surrounding the upper edges of the respective counterbores 21, the staked lips 26 forming constricted openings, the diameters of which are less than the diameters of the ball bearings so as to prevent egress of the balls from the retaining-apertures 18. By selecting bar stock, the thickness of which is properly proportioned with respect to the diameter of the ball bearings, the ball bearings are adapted to seat on the annular supporting-shoulders 22 of their respective apertures 18 or against the staked lips 26 in the manner hereinabove described, and in either case appreciable portions of the spherical surface of each ball bearing will project from the bottom and top faces of each unit, as shown especially well in Figs. 2 and 4. It will be noted, however, by reference especially to Fig. 3, that the distance measured between the annular shoulder 22 and the staked lip 26 respectively of each unit 16 is somewhat greater than the occluded portion of a ball bearing, whereby each ball is free to enjoy a limited amount of movement longitudinally in its respective aperture 18, for automatically compensating for slight irregularities in the dimensions and configurations of the raceways in which the packing may be used.

While it is conceivable that continuous lengths of the ball-bearing retaining-strip or packing, constructed as described above, may be manufactured manually, it is proposed to manufacture the strip by automatic machinery at a high rate of production to insure uniformity and accuracy of construction and relatively-low cost.

An illustration of the use of the antifriction bearing-packing as an end-thrust bearing is shown in Figs. 4 and 5, wherein a strip of predetermined length is cut from a continuous length of antifriction bearing-packing and wrapped around the reduced end 27 of a shaft 28 with the longitudinal axes of the bearing-retaining apertures of the packing substantially parallel to the longitudinal axis of the shaft and the projecting spherical portions of the bearing balls in engagement with an annular shoulder 29 of the shaft and an annular seat 30 of the shaft-supporting frame-member 31. In like manner, by cutting off the proper length of antifriction bearing-packing from a continuous length or reel of the material, an economical and satisfactory bearing may be readily provided for shafts, arbors and the like, of widely varying diameters.

A further application of the antifriction bearing-packing is shown in Figs. 6 and 7 wherein a predetermined length of the material is cut from a continuous length and wrapped around a shaft 32 to form a single ring-bearing in an annular raceway 33 between the periphery of the reduced end 34 of the shaft and the annular wall 35 of the shaft-supporting frame-member 36, the longitudinal axes of the ball-bearing retaining-apertures 18 of the individual units 16 extending radially from the shaft and the projecting surfaces of the balls bearing on the periphery of the reduced end 34 of the shaft and the annular wall 35 of the raceway 33. As in the previous instance, a predetermined length of bearing-packing material may be selected to meet the requirements of an infinite number of shaft sizes. Moreover, while a single wrapping of antifriction bearing-packing is shown in Figs. 6 and 7, it will be appreciated that two or more than two wrappings of the bearing-packing may be made spirally around a shaft to provide, in effect, an antifriction ball-bearing sleeve extending along the length of the shaft. In this connection, a still further application of the antifriction bearing-packing is shown in Fig. 8 wherein a predetermined length of the packing 15 is shown wrapped substantially spirally around the conical end 37 of a shaft 38. Since the ligaments 17 which join the successive ball-bearing units 16 of the bearing-packing are capable of flexure in substantially any direction, the packing readily accommodates itself to the conical surface shown in Fig. 8, as well as to similar curved surfaces and surfaces of compound curvature.

The showing of Fig. 9

Inasmuch as certain of the parts shown in Figs. 9, 10 and 11 to be described, are similar to parts previously described, certain of the parts shown in these figures have similar reference characters applied thereto plus the subscript "a."

A modification of the antifriction bearing-packing strip is shown in Fig. 9 wherein the individual units 16a of the strip are fabricated from a continuous length of sheet metal by blanking out the sides 39 and top and bottom portions 41 and 42 respectively of each unit and bending these sheet-metal portions over so as to form the substantially-hollow rectangular sheet-metal unit 16a. In this connection, it will be noted that the top portion 41 of each unit is of two-part construction and formed by bending over extensions of each respective side 39, this construction permitting assembly of the bearing balls within the units 16a, as hereinafter described. Substantially-vertical apertures 43 and 44 are provided in those respective blanked portions 41 and 42 of the strip which correspond to the upper and lower faces thereof for accommodating a ball bearing 24a, each of which is adapted to be assembled within its respective unit by seating the ball in the aperture 44 of that portion of a blanked strip which corresponds to the bottom face of a unit, and then bending the side portions 39 thereof upwardly at substantially right angles to the bottom face and the respective extensions of the side portions inwardly at substantially right angles thereto, to form the divided top face 41 of the completed unit 16a. In blanking out the sheet-metal portions of each unit 16a, the portions corresponding to the opposite ends of each unit are formed with integral neck-down ligaments 17a which connect each unit to the preceding and succeeding unit formed from the continuous length of sheet metal. In the preferred construction, each ligament 17a is bowed upwardly, as indicated clearly in Fig. 11, to provide flexibility for deflection in substantially any direction. Thus, the continuous strip of units 16a may be bent to form a radial or thrust-bearing, as hereinabove described, or a sleeve-bearing conforming to the configuration of the shaft or arbor upon which it is to be mounted. As used herein, the term "integral" as applied to the necked-down ligament connecting each successive unit of the antifriction bearing-packing shall also connote a welded connection between successive units.

The improved antifriction bearing-packing is adapted for manufacture by automatic machinery for production of continuous lengths of the packing at relatively low cost, the continuous lengths of packing being adapted to be wound on reels for convenience in handling and sold by linear measure to meet the requirements of any particular job, the characteristic feature of the packing being the use of an integral flexible ligament between successive antifriction bearing-units flexible in substantially any direction, whereby the strip may be used either as a radial bearing, as an end-thrust bearing or as an antifriction bearing-sleeve consisting of successive spirals of the bearing-packing wound upon a shaft or arbor. In this connection, it should be pointed out that when either embodiment of the invention is wrapped spirally around a shaft or forms a plurality of radial bearings thereon, the side walls of the respective ball-retaining units of each convolution engage the side walls of the ball-retaining units of the convolutions on adjacent sides thereof respectively, to prevent the successive ball-bearing wrappings from becoming entangled or crossed, thereby insuring smooth and dependable operation. While a distinguishing characteristic of the improved bearing-packing is its flexibility, it will be appreciated that the packing may be used as a substantially straight strip for application as a needle bearing and as an antifriction bearing-runner for drawers, doors and related purposes.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. An antifriction bearing-retainer, comprising: a plurality of individual antifriction bearing-retaining elements, each element comprising a hollow substantially rectangular sheet-metal unit having bearing-receiving apertures in the upper and lower faces thereof; antifriction bearings comprising bearing balls, said bearing balls being mounted within said bearing-retaining elements with portions of the balls projecting from the apertures in the upper and lower faces thereof; and flexible-means joining each adjacent pair of elements to permit said bearing-retainer to be bent for use both as an end-thrust bearing and as a radial bearing, said flexible connecting-means comprising an integral portion of reduced cross section common to each adjacent pair of bearing-retaining elements and flexible in all directions.

2. An antifriction bearing-retainer, comprising: a plurality of individual antifriction bearing-retaining elements, each element comprising a hollow sheet-metal unit substantially rectangular in cross section and having bearing-receiving apertures in the upper and lower faces thereof; antifriction bearings comprising bearing balls, said bearing balls being mounted within said bearing-retaining elements with portions of the balls projecting from the apertures in the upper and lower faces thereof; and flexible-means joining each adjacent pair of elements to permit said bearing-retainer to be bent for use both as an end-thrust bearing and as a radial bearing, said flexible connecting-means comprising an integral U-shaped ligament of reduced cross section common to each adjacent pair of bearing-retaining elements and flexible in all directions.

3. An antifriction bearing-retainer, comprising a plurality of individual antifriction bearing-retaining elements, each element comprising a hollow sheet-metal unit substantially rectangular in cross section, said unit having bearing-receiving apertures in the upper and lower faces thereof and a slot in the upper face of said unit extending longitudinally thereof; antifriction bearings comprising bearing balls, said bearing balls being mounted within said bearing-retaining units with portions of the balls projecting from the apertures in the upper and lower faces thereof; and flexible-means joining each adjacent pair of units to permit said bearing-retainer to be bent for use both as an end-thrust bearing and as a radial bearing, said flexible connecting-means comprising an integral U-shaped ligament of reduced cross section common to each adjacent pair of bearing-retaining units and flexible in all directions.

DONALD H. LAPOINTE.

REFERENCES CITED

The following references are of record in the file of this patent:

UNITED STATES PATENTS

| Number | Name | Date |
|---|---|---|
| 918,785 | Sonnberg | Apr. 20, 1909 |
| 1,002,245 | Eitner | Sept. 5, 1911 |
| 1,241,669 | Schneider | Oct. 2, 1917 |
| 1,327,169 | Nystrom | Jan. 6, 1920 |
| 1,330,158 | Arnold | Feb. 10, 1920 |

FOREIGN PATENTS

| Number | Country | Date |
|---|---|---|
| 595,844 | France | Oct. 9, 1925 |
| 127,341 | Switzerland | Aug. 20, 1927 |